United States Patent
Hendry

[19]

[11] Patent Number: 5,885,518

[45] Date of Patent: Mar. 23, 1999

[54] METHOD FOR INJECTION MOLDING UTILIZING A VARIABLE VOLUME SPILL AREA WITHIN AN ARTICLE-DEFINING MOLD CAVITY AND ARTICLE PRODUCED THEREBY

[75] Inventor: James W. Hendry, Brooskville, Fla.

[73] Assignee: Melea Limited, Gibraltar Hts., Gibraltar

[21] Appl. No.: 883,867

[22] Filed: Jun. 27, 1997

Related U.S. Application Data

[63] Continuation of Ser. No. 568,962, Dec. 7, 1995, abandoned, which is a continuation-in-part of Ser. No. 492,589, Jun. 21, 1995, Pat. No. 5,607,640.

[51] Int. Cl.⁶ .......................... B29C 45/00; B29D 22/00
[52] U.S. Cl. ............................................................. 264/572
[58] Field of Search .............................. 264/572; 425/130

[56] References Cited

U.S. PATENT DOCUMENTS

| | | |
|---|---|---|
| 2,331,688 | 5/1943 | Hobson . |
| 3,044,118 | 6/1962 | Bernhardt et al. . |
| 3,135,640 | 6/1964 | Kepka et al. . |
| 4,101,617 | 7/1978 | Friederich . |
| 4,129,635 | 12/1978 | Yasuike et al. ........................ 264/572 |
| 4,136,220 | 1/1979 | Olabiai . |
| 4,414,167 | 11/1983 | Prusak et al. . |
| 4,740,150 | 4/1988 | Sayer . |
| 5,069,859 | 12/1991 | Loren . |
| 5,098,637 | 3/1992 | Hendry . |
| 5,252,287 | 10/1993 | Fries . |
| 5,262,105 | 11/1993 | Komiyama et al. . |
| 5,304,341 | 4/1994 | Shah . |
| 5,639,417 | 6/1997 | Kaneishi et al. ........................ 264/572 |

FOREIGN PATENT DOCUMENTS

| | | |
|---|---|---|
| 2125623 | 10/1994 | Canada . |
| 0529080 | 1/1991 | European Pat. Off. . |
| 438279 A1 | 7/1991 | European Pat. Off. ............... 264/572 |
| 0498444 | 8/1992 | European Pat. Off. . |
| 628395 | 12/1994 | European Pat. Off. . |
| 0692360 | 1/1996 | European Pat. Off. . |
| 4002503 | 5/1991 | Germany . |
| 3940186 | 6/1991 | Germany . |
| 4128883 | 3/1993 | Germany . |
| 4334012 | 10/1994 | Germany . |
| 64-142057 | 6/1989 | Japan . |
| 3-9820 | 1/1991 | Japan ..................................... 264/572 |
| 3-121820 | 5/1991 | Japan ..................................... 264/572 |
| 5-154862 | 6/1993 | Japan . |
| 6-143318 | 5/1994 | Japan . |
| 6-285895 | 10/1994 | Japan . |
| 7-148768 | 6/1995 | Japan . |
| 2260932 | 5/1993 | United Kingdom . |
| WO92/07697 | 5/1992 | WIPO . |
| WO9207697 | 5/1992 | WIPO . |
| WO95/20477 | 8/1995 | WIPO . |

OTHER PUBLICATIONS

Magazine "Spritzgiessen von Kunststoffen", 279 Kunststoffberater 28 (1983) Sep. No. 9, Isernhagen, Deutschland.

*Primary Examiner*—Leo B. Tentoni
*Attorney, Agent, or Firm*—Brooks & Kushman P.C.

[57] ABSTRACT

A method and system for injection molding plastic articles which utilize a spill area whose volume varies within an article-defining mold cavity. In one embodiment, the volume increases during introduction of pressurized gas into the mold cavity. In another embodiment, the volume of the spill area varies during a plastic injection which fills the mold cavity. A core reciprocally mounted within the mold cavity partially defines the variable volume of the spill area. An air spring is utilized to control pressure on the core which counters the pressure of the plastic at an end face of on the core. In one embodiment, the end face of the core is non-flat to create an area where fluid plastic can exert pressure against the end face within the mold cavity during plastic injection and/or during introduction of pressurized gas.

7 Claims, 4 Drawing Sheets

METHOD FOR INJECTION MOLDING UTILIZING A VARIABLE VOLUME SPILL AREA WITHIN AN ARTICLE-DEFINING MOLD CAVITY AND ARTICLE PRODUCED THEREBY

CROSS-REFERENCE TO RELATED APPLICATION

This is a continuation of application(s) Ser. No. 08/568,962 filed on Dec. 7, 1995 now abandoned which is C-I-P of U.S. Ser. No. 08/492,589 filed Jun. 21, 1995, now U.S. Pat. No. 5,607,640.

TECHNICAL FIELD

This invention relates to plastic injection molding and, more particularly, to plastic injection molding which includes a spill area.

BACKGROUND ART

In the plastic injection molding art, the usual challenges facing a product designer is to design an article having requisite strength for the product application and uniform surface quality for satisfactory appearance, but to avoid excessive weight, material usage and cycle time. A design compromise must often be made between strength and plastic thickness. A relatively thicker plastic section in the article, such as a structural rib, will incur greater weight, material usage, cycle time and induce sink marks and other surface defects due to thermal gradients in the area of the thickened section.

It is known in the plastic molding art to use pressurized fluid in conjunction with the plastic molding of articles as shown in U.S. Pat. No. 5,098,637 to Hendry. The pressurized fluid is typically nitrogen gas which is introduced into the mold cavity at or near the completion of the plastic injection. The pressurized fluid serves several purposes. First, it allows the article so formed to have hollow interior portions which correspond to weight and material savings. Second, the pressurized fluid within the mold cavity applies outward pressure to force the plastic against the mold surfaces while the article solidifies. Third, the cycle time is reduced as the gas migrates through the most fluent inner volume of the plastic and replaces the plastic in these areas which would otherwise require an extended cooling cycle. Fourth, the gas pressure pushes the plastic against the mold surfaces, thereby obtaining the maximum coolant effect from the mold.

However, as the dimensions of the molded article increase, the gas must do more work to migrate through the volume of the mold cavity to assist in setting up the article within the cavity. If the pressure of the gas is too great as it enters the mold cavity, there is a risk that it may rupture or blow out the plastic within the mold cavity, i.e., the gas is not contained within the plastic. Thus, there have been practical limitations in the adaptation of gas injection in the plastic molding field.

The above-noted U.S. patent to Hendry solves most of these problems.

As illustrated in FIGS. 1–4, another approach is to use a fixed volume spill cavity 24 with a block pin 20 and shims 26 to control the volume of plastic going into the spill cavity 24.

In FIG. 1, the pin 20 is in its up position blocking plastic flow from the molding in the article-defining cavity 12, through a runner 23 and into the spill cavity 24. In FIGS. 2–4, the pin 20 is in its down position allowing plastic to go to the spill cavity 24 by the pressure of the gas.

However, injection molding machines do not deliver the same quantity of plastic shot after shot. When doing straight compact injection molding, the cushion of plastic in front of the screw after the mold is full and the high pressure packing starts, takes care of this inaccuracy of the screw ram to deliver the same quantity of plastic on each shot (i.e., the cushion can fall from 10 mm to 5 mm with no difficulty in molding the compact injection molding).

However, with some parts, one does not want to pack the molding. One wants to just fill the cavity. If one packs the molding, a strain pattern will already be in place within the molding and the hollowing out of the part will not relieve the strain already in place in the molding.

FIG. 2 illustrates blow out in the spill cavity 24 causing a loss of gas pressure in the molding in the article defining cavity 21. One result of this is a possible shrinkage due to loss of gas pressure in the molding in the article defining cavity 21. Also, gas leakage may occur at the mold parting line.

FIG. 3 illustrates the use of too much plastic which would result in sink marks at reference numeral 26.

Finally, FIG. 4 illustrates the addition of the shims 26. However, overpacking and blow out as illustrated in FIGS. 3 and 2, respectively, can still occur.

SUMMARY OF THE INVENTION

An object of the present invention is to provide a method and system for injection molding utilizing a variable volume spill area which: (1) eliminates the need for a shut off pin in a fixed volume shut off situation; (2) eliminates blow out in a spill over area that causes loss of gas pressure in the gas channel and resulting collapsing of the walls of the gas channels; (3) eliminates inaccuracies in the screw ram to deliver the same quantity of plastic shot after shot; and (4) allows positive displacement of plastic into a spill area within the article-defining mold cavity to insure no blow out as in FIG. 2 or solid as in FIG. 3, and a strain-free molding (i.e., no overpacking).

In carrying out the above object and other objects of the present invention, a method is provided for injection molding a hollow plastic article. The method includes the steps of injecting a quantity of fluid plastic into a mold cavity having a shape defining at least a portion of the article; displacing a portion of the plastic from the mold cavity into a spill area by introduction of a charge of pressurized gas into the mold cavity; permitting the injected plastic to solidify; venting the gas from the mold cavity; and removing the plastic article from the mold. The improvement of the method includes the step of allowing the volume of the spill area to increase during the step of displacing to produce a substantially strain-free hollow plastic article wherein the spill area is within the mold cavity.

Preferably, the volume of the mold cavity is partially defined by an end face of a core reciprocally mounted in the mold cavity.

In one embodiment, the method further includes the step of increasing pressure on the core to move the core to an extended position within the mold cavity and wherein the step of allowing includes the step of reducing the pressure on the core to allow the core to move to a retracted position.

Further in carrying out the above objects and other objects of the present invention, a system is provided for carrying out the above-noted method steps.

Still further in carrying out the above objects and other objects of the present invention, another method for injection molding a plastic article is provided. The method includes the steps of injecting a quantity of fluid plastic into a mold cavity having a shape defining at least a portion of the article; allowing a portion of the plastic from the mold cavity in flow into a spill area during the step of injecting by introduction of a charge of pressurized gas into the mold cavity; permitting the injected plastic to solidify; and removing the plastic article from the mold. The improvement of the method includes the step of allowing the volume of the spill area to increase during the step of injecting to produce a substantially strain-free plastic article wherein the spill area is within the mold cavity.

In the one embodiment, the method and system of the present invention preferably utilize a pneumatic spring coupled to the core so that when the pressure of the plastic being injected by a screw ram overcomes the pressure on the core, the core will move out of the mold cavity making sure that the molding will not see more pressure than the fill pressure. Therefore, the hollow plastic part will be substantially strain-free. In this way, the inaccuracy of the screw ram to deliver the same quantity of plastic shot after shot is compensated for.

The present invention admits to molding of structural articles for use in diverse product fields, such as a bumper having a pair of end wings for an automobile.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 6:
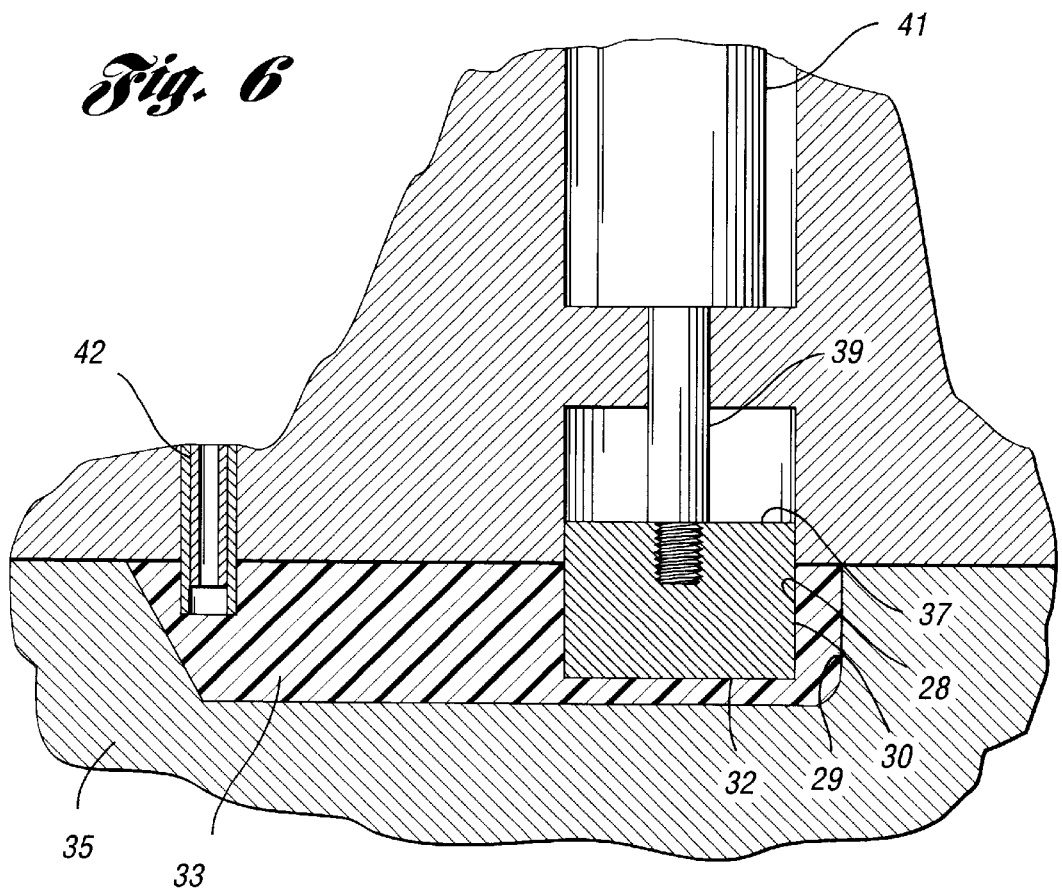
FIG. 6 is a schematic cross-sectional view, partially broken away, illustrating the method and system of the present invention including a core coupled to a pneumatic spring after the step of plastic injection.
Figure 7:
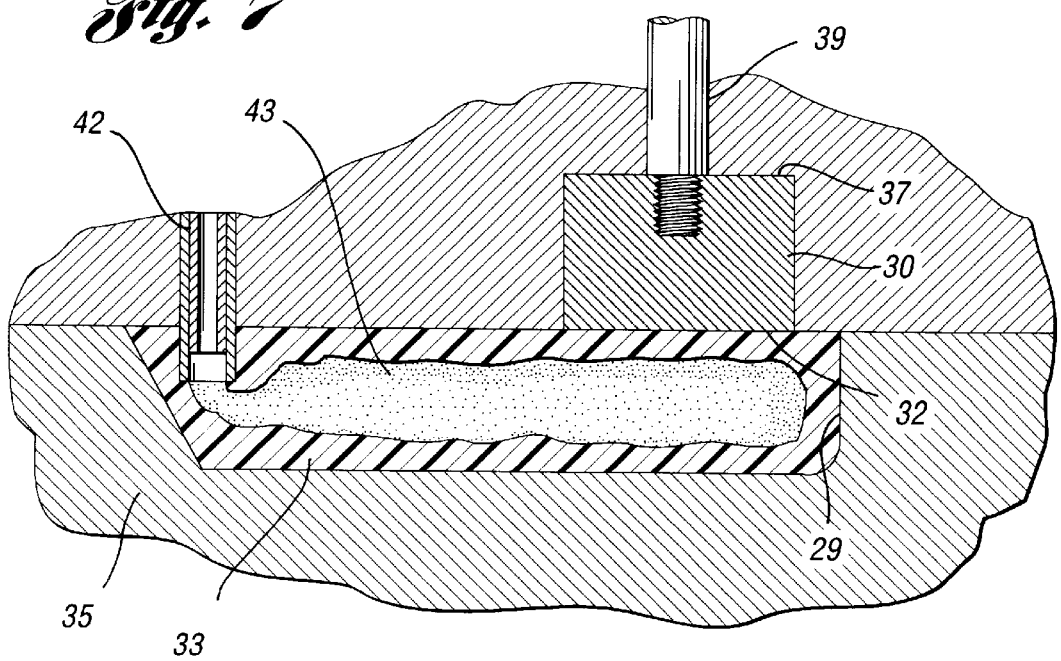
FIG. 7 is a view similar to FIG. 6 after the introduction of pressurized gas into the mold cavity to form the hollow part.

FIGS. 6 and 7 broadly illustrate the method and system of the present invention wherein a variable volume spill area 28 is located within a gas channel of a mold cavity 29 of a mold core side 35 of a mold. The volume of the area 28 is controlled and is varied by the position of a core 30, the end face 32 of which is exposed to a pressure from plastic 33 within the mold cavity 29. The core 30 is coupled at its opposite face 37 by a rod 39 to a pneumatic spring 41.

The core 30 may be square, round, rectangular or odd shaped to suit the gas channel within the cavity 29.

FIG. 6 illustrates the core 30 in its extended position within the mold cavity 29 with the mold closed during injection of the plastic into the gas channel within an article-defining cavity 29 The spring 41 has a preset pressure which causes the core 30 to extend into the cavity 29.

FIG. 6 illustrates the location of the plastic after it has been injected into the article-defining cavity 29 wherein inaccuracies in shot weight delivered by the screw ram are taken up by a lower portion of the spill area 28 (i.e., the core 30 moves up slightly). If the injection pressure of the plastic to fill the mold is, for example, 1000 psi then its lower portion of the spill area 28 will take up the 1000 psi and not allow the screw ram to go into a packing phase at a pressure much higher than 1000 psi. If such a pressure over 1000 psi was reached, this would strain the molding in the article defining cavity 29.

The pneumatic pressure of the spring 41 must be equal to the plastic injection pressure to fill the cavity 29 completely. The spill area 28 takes care of excess plastic injection.

FIG. 7 illustrates gas injected into the molding in the article defining cavity 29 by a gas pin 42 to create a void 43. Excess plastic is passed into the spill area 28 vacated by the core 30 within the cavity 29. In other words, the core 30 moves to create the spill area 28 in the cavity 29 when the gas pressure through the pin 42 in the cavity 29 overcomes the preset gas pressure of the air spring 41.

Before gas injection starts, the pressure of the spring 41 is reduced to a value that will allow gas injection pressure to move the core 30. There must be plastic at the end face 32 of the core 30 so gas pressure can be imposed on the core 30 to move it towards its retracted position. If the core 30 does not, at this time, move to its fully retracted position because of pressure equalization on the core 30, the pressure of the spring 41 may be further reduced.

Figure 8:
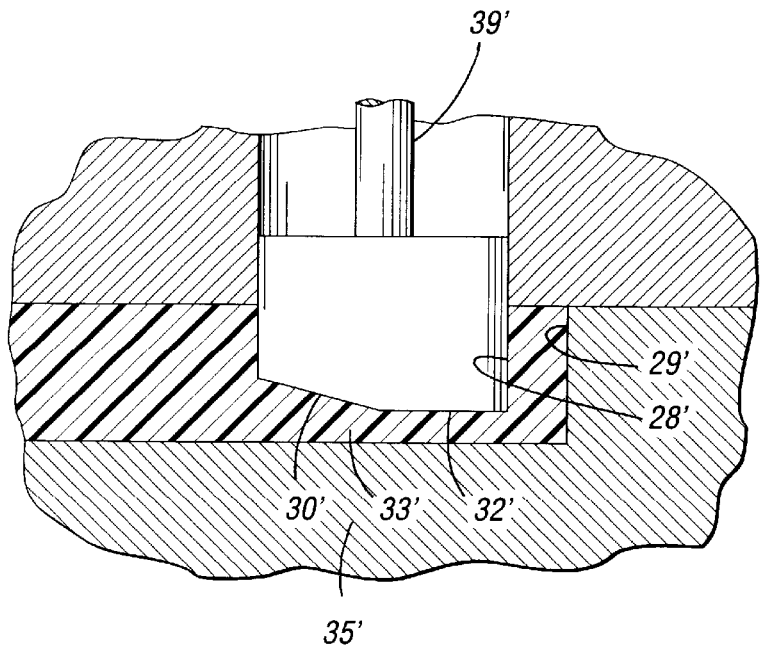
FIG. 8 is a schematic cross-sectional view, partially broken away, of a second embodiment of a core of the present invention.

Referring now to FIG. 8, there is illustrated a second embodiment of a core 30' of the present invention wherein parts which are the same or perform substantially the same function as the parts of FIGS. 6 and 7 have the same reference numerals but a prime designation. An end face 32' of the core 30' is chamfered to create more volume between the end face 32' and the mold core side 35'. This ensures that sufficient molten plastic is at this location to permit the gas injection pressure to be felt at the end face 32'.

Figure 9:
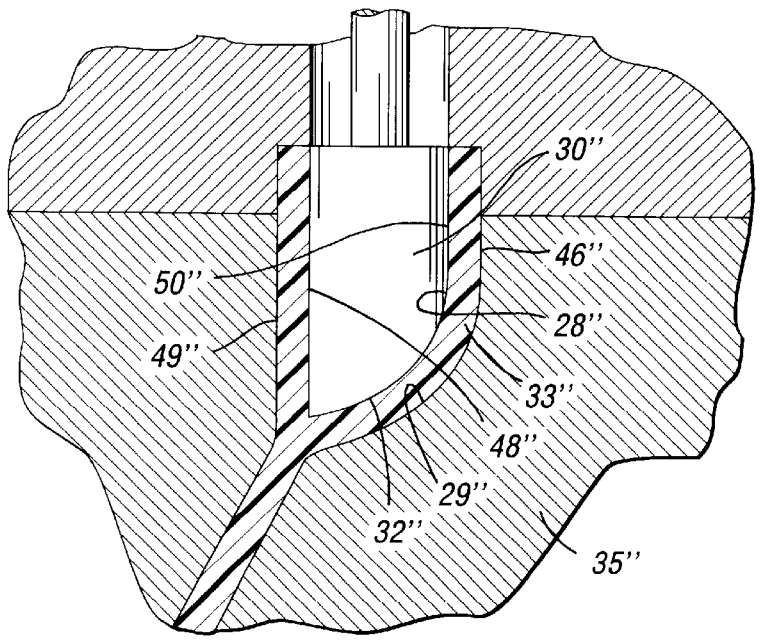
FIG. 9 is a schematic cross-sectional view, partially broken away, of a third embodiment of a core of the present invention.

Referring now to FIG. 9, there is illustrated yet another embodiment of a core 30" of the present invention where parts which are the same or perform substantially the same function as the parts of FIGS. 6 and 7 have the same reference numeral but a double prime designation. An end face 32", of the odd-shaped core 30" is curved. While faces 44" and 46" of the mold core side 35" may touch sides 48" and 50", respectively, of the core 30" during plastic injection, the end face 32" must have room between it and a facing surface of the mold core side 35" to allow a sufficient amount of plastic to flow therein so that the gas pressure can reach the end face 32" with enough pressure to move the core 30" before the plastic at the end face 32" hardens.

Figure 1:
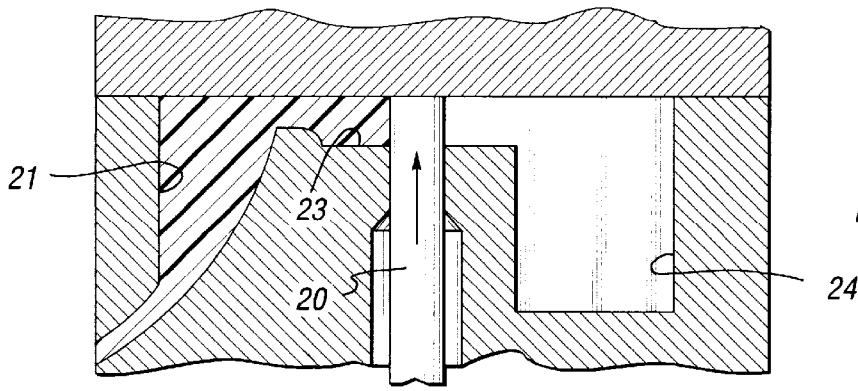
FIG. 1 is a schematic cross-sectional view, partially broken away, of a prior art injection molding method utilizing a pin to prevent plastic flow into a fixed volume spill cavity.
Figure 2:
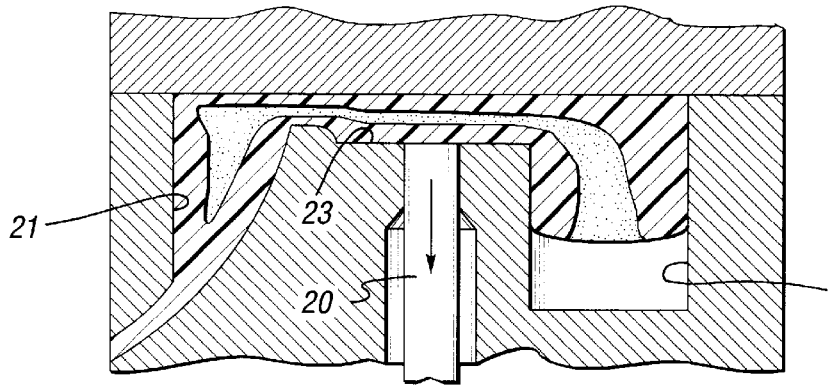
FIG. 2 is a view similar to FIG. 1 with a pin in its down position and illustrating blow out in the spill cavity due to the lack of sufficient amount of plastic in the article defining cavity.
Figure 3:
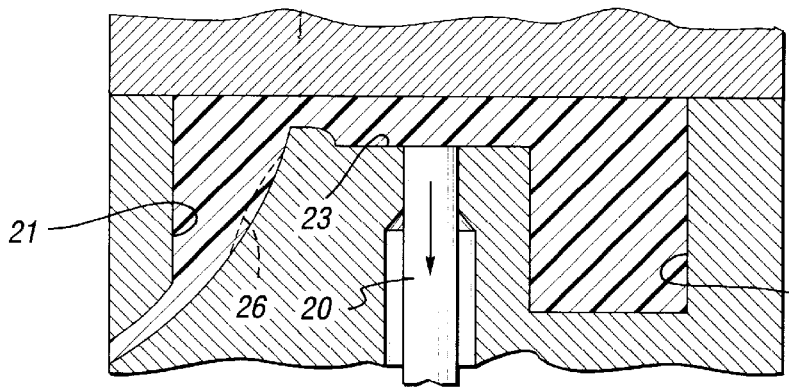
FIG. 3 is a view similar to FIG. 2 except too much plastic has been utilized with resulting sink marks.
Figure 4:
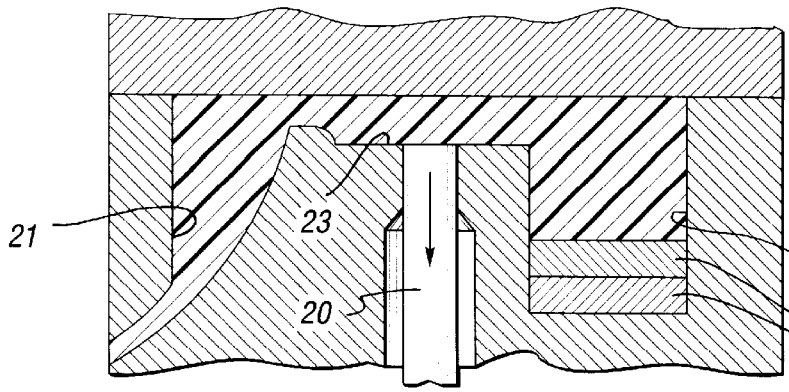
FIG. 4 is a view similar to the views of FIGS. 2 and 3 with the addition of shims located at the bottom of the spill cavity.
Figure 5:
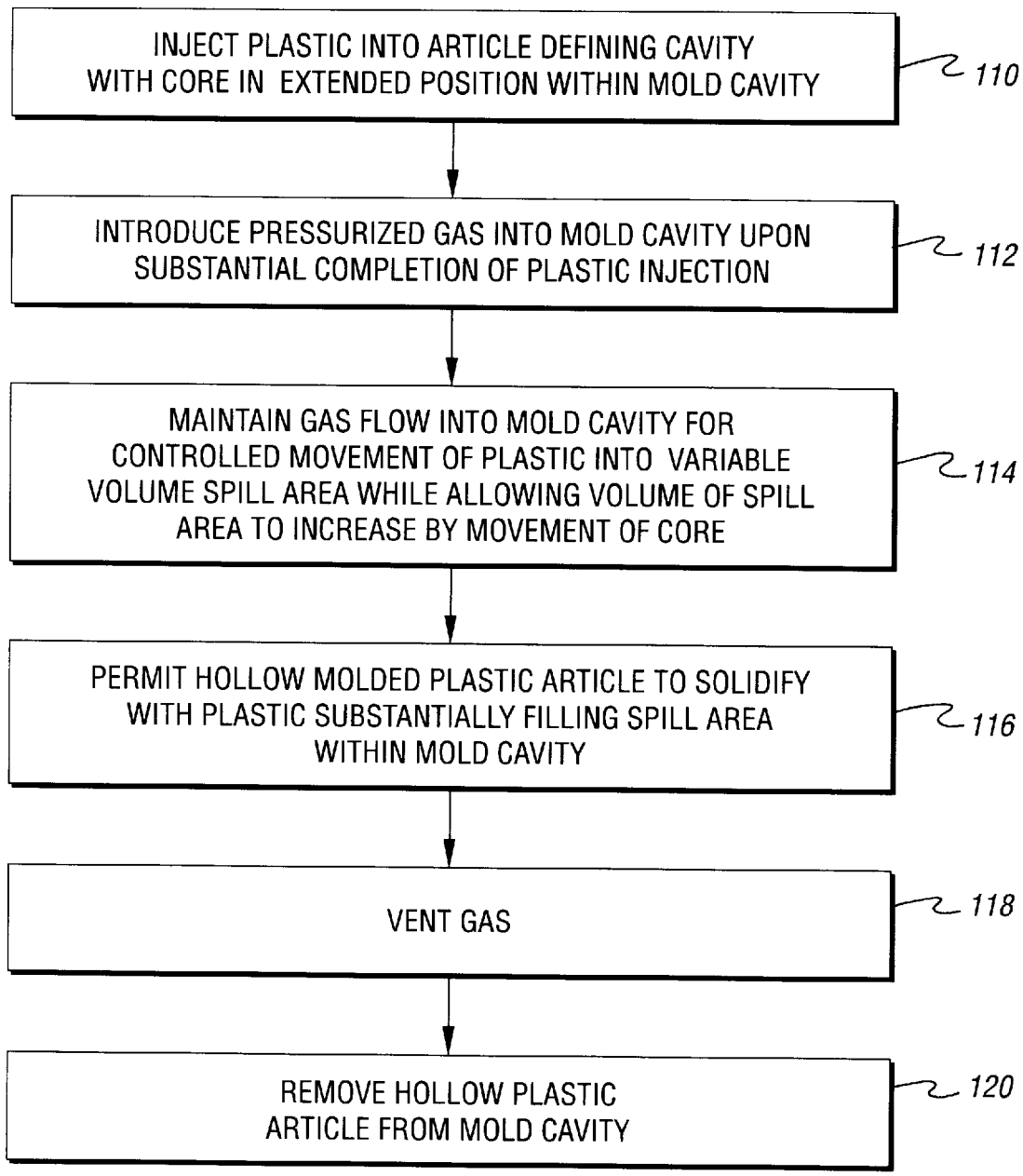
FIG. 5 is a flow chart indicating the basic steps involved in the practice of the method of the present invention.

FIG. 5 is a flow chart of the steps involved in practicing the process of the present invention.

In step 110, a quantity of molten plastic is injected from an injection molding machine into the channel of the article-defining mold cavity 29 with the core 30 fully extended (i.e., FIG. 6). The plastic may be most thermoplastics and the invention works particularly well with glass or mineral filled thermoplastic polyester, commonly known by the trademark Valox of General Electric Co. The quantity is sufficient to fill the mold cavity 29 not occupied by the core 30 and may partially move the core 30 upward to partially fill the spill area 28. Prior to plastic injection, the core 30 is in its fully extended position as illustrated in FIG. 6 due to the preset gas pressure of the spring 41.

In step 112 (i.e., FIG. 7), a charge of pressurized gas is introduced into the mold by the gas pin 42 upon substantial completion of the injection of the quantity of molten plastic. Obviously, other ways of introducing gas into the mold are possible such as through a nozzle as illustrated in U.S. Pat. No. 4,101,617 to Friederich.

In step 114, the gas flow into the mold is maintained in pressure and duration in amount and time sufficient to displace a controlled quantity of plastic from the article defining mold cavity 29 into the spill area 28 defined by the end face 32 and side surfaces of the core 30. Movement of the core 30 due to the pressure of the gas causes an additional amount of plastic to flow into the spill area 28. The gas tends to displace the hottest, most fluent plastic in the central portion of the mold cavity. Consequently, the molded plastic article has a hollow interior where the least viscous plastic has been displaced. The presence of the gas affords savings in weight and material usage. Added benefits include enhanced surface quality due to the outward pressure exerted by the gas, and reduced cycle time due to displacement of the relatively hot plastic from the central portion of the article.

In step 116, the article is permitted to solidify within the mold cavity 29 including the spill area 28 vacated by the core 30 while the internal gas pressure is maintained.

In step 118, the pressurized gas is vented from the interior of the molded article preparatory to opening the mold. Numerous ways of venting are possible such as described in the U.S. Pat. No. 4,101,617 to Friederich.

In step 120, the plastic article is removed from the mold.

The following steps are utilized in practicing the method and system of FIGS. 6 and 7:

1. Core 30 is held in its extended position by the preset pressure of the spring 41 when the mold closes.
2. Pressure on the core 30 is equal to the plastic injection pressure.
3. During injection of plastic, the plastic in excess of what is required to fill the molding will go into a portion of the spill area defined by the core 30 only at the pressure of injection thereby causing the core 30 to move slightly upwardly. This eliminates (a) overpacking of molding and (b) inaccuracy of the injection unit to deliver the same quantity of plastic on each shot. The gas pressure set on the air spring 41 will stay constant and not increase as plastic enters, as it is coupled to a gas relief valve (not shown) set at the injection pressure.
4. When gas is injected into the molding, the pressure on the core 30 is reduced automatically to, for example, one-half of gas injection pressure.
5. As the pressure now on the core 30 is locked in, as the plastic is pushed into the spill area 28 vacated by the core 30, the pressure on the core 30 will increase in direct proportion to its retracting movement.
6. When the pressure from gas injection equalizes with the pressure on the core 30, no more movement of plastic into the spill area will occur (i.e., the core no longer moves upwardly). If not enough plastic goes into the spill area 28, either further reduce pressure on the core 30 or increase pressure of gas injection. If too much plastic goes into the spill area 28, just reverse the above (i.e., put more pressure on the core 30 or decrease gas inlet pressure).
7. Open mold and eject finished product.

This design eliminates the need for a shut-off pin between the article defining cavity and the spill over. This design further eliminates overpacking of the mold cavity and takes care of the inaccuracies of the screw to deliver precise shot weights on each cycle.

While the best mode for carrying out the invention has been described in detail, those familiar with the art to which this invention relates will recognize various alternative designs and embodiments for practicing the invention as defined by the following claims.

What is claimed is:

1. In a method for injection molding a hollow plastic article in a mold having first and second mold halves which provide a mold cavity, the method comprising the steps of:

injecting a quantity of fluid plastic into the mold cavity having a shape defining at least a portion of the article in a closed position of the mold;

displacing a portion of the plastic from the mold cavity into a spill area by introduction of a charge of pressurized gas into the mold cavity;

permitting the injected plastic to solidify;

venting the gas from the mold cavity; and removing the plastic article from the mold in an open position of the mold, the improvement comprising:

filling the mold cavity outside the spill area with fluid plastic without packing the fluid plastic in the mold in the closed position of the mold;

allowing the volume of the spill area to increase by movement of a core mounted within one of the mold halves for movement substantially perpendicular with respect to parting lines of the mold in a controlled fashion, the volume increasing to a final volume based on the amount of plastic injected into the mold cavity, the volume of the spill area increasing during the step of displacing to produce a substantially strain-free hollow plastic article and wherein the spill area is within the mold cavity;

wherein the volume of the spill area is at least partially defined by a surface of the core.

2. The method as claimed in claim 1 wherein the volume of the spill area is at least partially defined by an end face of the core which is reciprocally mounted in the mold cavity and having an extended position and a retracted position and wherein the method further comprises the step of varying the pressure on the core to move the core to its extended position.

3. The method of claim 2 wherein the step of allowing includes the step of reducing the pressure on the core to allow the core to move towards its retracted position.

4. The method as claimed in claim 1 further comprising the step of allowing the volume of the spill area to increase during the step of injecting to produce a substantially strain-free hollow plastic article.

5. In a method for injection molding a plastic article in a mold having first and second mold halves which provide a mold cavity, the method comprising the steps of:

injecting a quantity of fluid plastic into the mold cavity having a shape defining at least a portion of the article in a closed position of the mold;

allowing a portion of the plastic from the mold cavity to flow into a spill area during the step of injecting by introduction of a charge of pressurized gas into the mold cavity;

permitting the injected plastic to solidify; and removing the plastic article from the mold in an open position of the mold, the improvement comprising:

filling the mold cavity with fluid plastic outside the spill area without packing the fluid plastic in the mold in the closed position of the mold;

allowing the volume of the spill area to increase by movement of a core mounted without one of the mold halves for movement substantially perpendicular with respect to parting lines of the mold in a controlled fashion, the volume increasing to a final volume based on the amount of plastic injected into the mold cavity, the volume of the spill area increasing during the step of injecting to produce a substantially strain-free plastic article;

wherein the volume of the spill area is at least partially defined by a surface of the core.

6. The method as claimed in claim 5 wherein the volume of the spill area is at least partially defined by an end face of the core which is reciprocally mounted in the mold cavity and having an extended position and a retracted position and wherein the method further comprises the step of increasing the pressure on the core to move the core to its extended position.

7. The method of claim 6 wherein the step of allowing includes the step of reducing the pressure on the core to allow the core to move towards its retracted position.

* * * * *